US010209650B2

(12) United States Patent
Tsunoda

(10) Patent No.: US 10,209,650 B2
(45) Date of Patent: Feb. 19, 2019

(54) FIXATION DEVICE WITH ENDLESS BELT AND ROLLERS AND IMAGE FORMING APPARATUS HAVING THE SAME

(71) Applicant: Oki Data Corporation, Tokyo (JP)

(72) Inventor: Shigeru Tsunoda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/899,545

(22) Filed: Feb. 20, 2018

(65) Prior Publication Data

US 2018/0246443 A1 Aug. 30, 2018

(30) Foreign Application Priority Data

Feb. 28, 2017 (JP) ................................ 2017-035801

(51) Int. Cl.
*G03G 15/20* (2006.01)
*B29C 47/62* (2006.01)

(52) U.S. Cl.
CPC ......... *G03G 15/2017* (2013.01); *B29C 47/62* (2013.01); *G03G 15/2039* (2013.01); *G03G 15/2053* (2013.01); *G03G 2215/2022* (2013.01); *G03G 2215/2029* (2013.01)

(58) Field of Classification Search
CPC ........... G03G 15/2017; G03G 15/2039; G03G 15/2089; G03G 15/2078; G03G 15/2053; G03G 2215/2016; G03G 2215/2041; G03G 2215/2022; G03G 2215/2029; B29C 47/62
See application file for complete search history.

(56) References Cited

U.S. PATENT DOCUMENTS

2011/0262193 A1* 10/2011 Kimura .............. G03G 15/2064 399/329
2012/0275835 A1* 11/2012 Kuroda .............. G03G 15/2028 399/329
2013/0272757 A1* 10/2013 Amano .............. G03G 15/2053 399/329
2013/0322906 A1* 12/2013 Takatsuka .......... G03G 15/2039 399/69
2014/0369726 A1* 12/2014 Soeda ................ G03G 15/2053 399/329
2014/0369727 A1* 12/2014 Tsunoda ............ G03G 15/2064 399/329

FOREIGN PATENT DOCUMENTS

JP 2014-132369 A 7/2014

* cited by examiner

*Primary Examiner* — David M. Gray
*Assistant Examiner* — Laura Roth
(74) *Attorney, Agent, or Firm* — Metrolexis Law Group, PLLC

(57) ABSTRACT

A fixation device includes: an endless belt member; a first roller arranged inside the belt member; a second roller arranged outside the belt member and biased toward the first roller via the belt member; and a pressure member is biased toward the second roller via the belt member. A facing surface of the pressure member that faces the second roller includes a first flat section and a second flat section that intersect at an intersecting portion. A first end portion of the first flat section on the opposite side to the intersecting portion, a second end portion of the second flat section on the opposite side to the intersecting portion, and the intersecting portion are on an imaginary arc in a cross-section. A radius R of the imaginary arc satisfies, with respect a radius Rp of the second roller, an inequality of "(1/2)×Rp≤R≤(19/20)×Rp".

8 Claims, 9 Drawing Sheets

FIXATION DEVICE WITH ENDLESS BELT AND ROLLERS AND IMAGE FORMING APPARATUS HAVING THE SAME

CROSS REFERENCE TO RELATED APPLICATIONS

This application claims priority based on 35 USC 119 from prior Japanese Patent Application No. JP2017-035801 filed on Feb. 28, 2017, entitled "FIXATION DEVICE AND IMAGE FORMING APPARATUS", the entire contents of which are incorporated herein by reference.

BACKGROUND

This disclosure relates to an image forming apparatus such as a printer, a photocopier, a facsimile, or a multipurpose printer that utilizes an electrophotographic method, and particularly relates to a fixation device of the image forming apparatus.

In an image forming apparatus utilizing an electrophotographic method, a surface of a photosensitive drum is uniformly charged by a charge roller and then subjected to exposure by an exposure device such as a LED head to form an electrostatic latent image corresponding to image information, and a thin layer of toner formed on a development roller is electrostatically attached to the electrostatic latent image to form a toner image. Thereafter, a transfer roller transfers the formed toner image to a sheet fed from a sheet feed device and conveyed by a conveyance belt. Then, a fixation device fuses the toner image and the image is thus formed on the sheet.

As such a fixation device, there is a fixation device using a belt heating method in which a fixation belt formed of an endless belt is heated by a heater and is pressed against a fixation roller by a pressure roller facing the fixation roller to form a nip and the conveyed sheet is nipped in this nip to be heated and pressed to fuse the toner image onto the sheet (see, for example, Japanese Patent Application Publication No. 2014-132369 (paragraphs 0013 to 0016, and FIG. 1))

SUMMARY

However, the fixation device described above includes a pad on the entrance side of the nip and, when the fixation (the fusing) is performed particularly on a sheet with high stiffness such as a thick sheet, a gloss sheet, a label sheet, or a film, the sheet comes into excessive contact with the fixation belt at undesirable timing due to slack in the sheet conveyance or the like and the toner thereby excessively melts. Such phenomena cause problems such as uneven image after the fixation and good image quality is difficult to obtain.

An aspect is a fixation device that includes: an endless belt member; a first roller that is arranged inside the belt member; a second roller that is arranged outside the belt member and that is biased toward the first roller with the belt member arranged between the second roller and the first roller; and a pressure member that is arranged inside the belt member and adjacent to the first roller and that is biased toward the second roller with the belt member arranged between the pressure member and the second roller. A facing surface of the pressure member that faces the second roller includes a first flat section and a second flat section that intersect at an intersecting portion. A first end portion of the first flat section on the opposite side to the intersecting portion, a second end portion of the second flat section on the opposite side to the intersecting portion, and the intersecting portion are located on an imaginary arc in a cross section perpendicular to the intersecting portion. A radius R of the imaginary arc satisfies, with respect a radius Rp of the second roller, an inequality of "$(1/2) \times Rp \le R \le (19/20) \times Rp$".

According to the aspect described above, it possible to apply appropriate pressure with the pressure member and eliminate a region in which the endless belt and the recording sheet excessively come close to each other outside the nip portion. This can contribute to reliable fixation and prevention of toner image disturbance and rubbed print.

DETAILED DESCRIPTION

Figure 1:
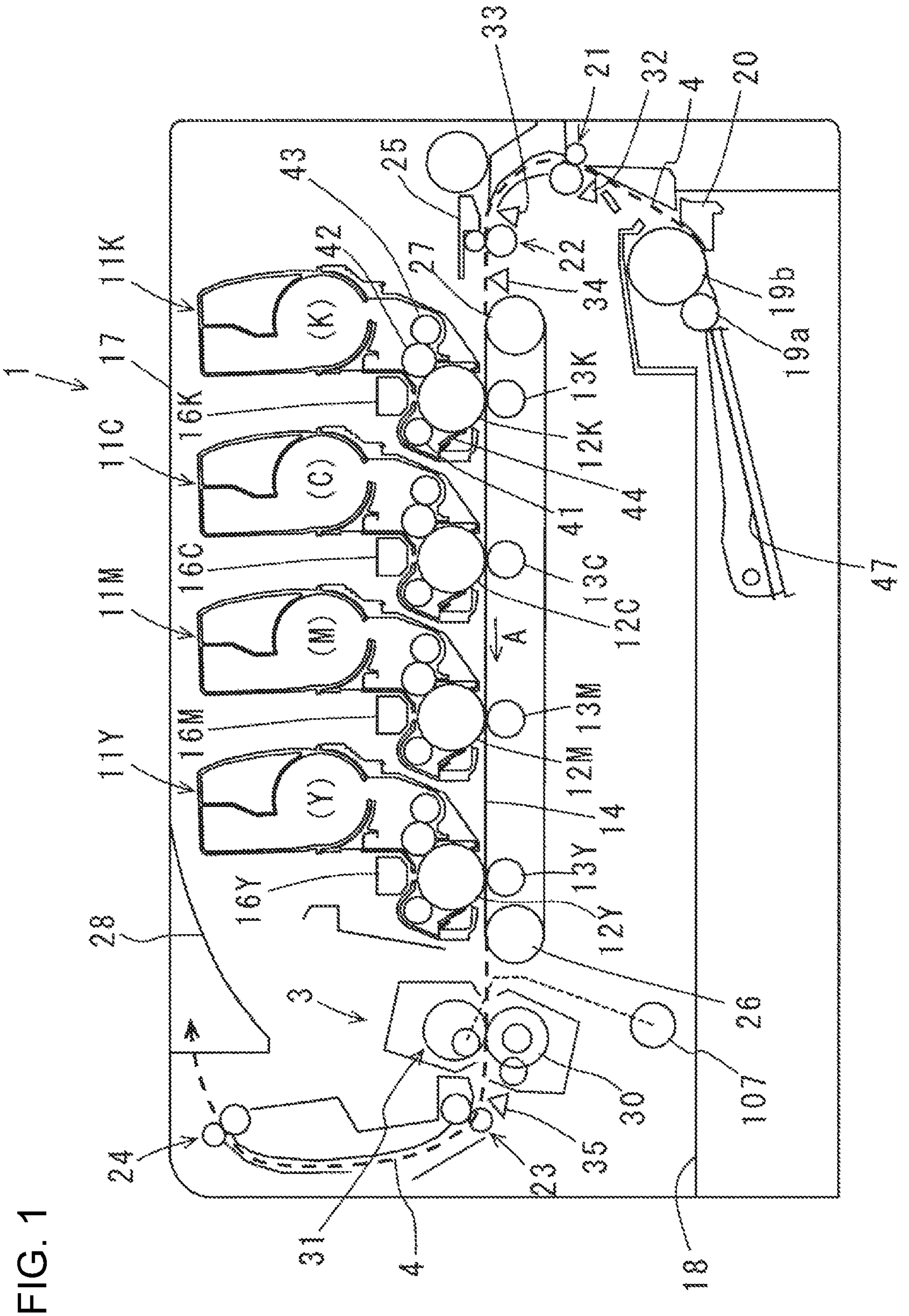
FIG. 1 is a schematic configuration diagram for explaining a general configuration of an image forming apparatus in one or more embodiments.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

FIG. 1 is a schematic configuration diagram for explaining a configuration of a main portion of an image forming apparatus in one or more embodiments.

The image forming apparatus 1 has a configuration as a color electrophotographic printer that can perform printing in four colors of black (K), cyan (C), magenta (M), and yellow (Y). As illustrated in FIG. 1, a sheet feed cassette 18 that houses recording sheets 47 being print media such as normal sheets is installed in a lower portion of an interior of the image forming apparatus 1 to be attachable and detachable, and a stacker 28 that collects the recording sheets 47 on which images are printed is arranged on an upper surface of an exterior of the image forming apparatus 1. The sheet feed cassette 18 and the stacker 28 are connected by a sheet conveyance route 4 (including an upper surface portion of a parallel portion of a conveyance belt 14) illustrated by a broken line in FIG. 1 and formed in a substantially S-shape.

An image forming unit 11K for black (K), an image forming unit 11C for cyan (C), an image forming unit 11M for magenta (M), and an image forming unit 11Y for yellow (Y) (when there is no need to distinguish the image forming units from one another, they are sometimes referred to as image forming units 11) are arranged along the sheet conveyance route 4 corresponding to the upper surface portion of the parallel portion of the conveyance belt 14 in this order from the upstream side. The four image forming units 11 can be attached to and detached from a main body of the image forming apparatus 1 and an upper cover 17 of the image forming apparatus 1 is provided to be openable and closeable for this purpose.

Exposure devices 16K, 16C, 16M, 16Y (when there is no need to distinguish the exposure devices, they are sometimes referred to as exposure devices 16) supported by the upper cover 17 are arranged to correspond to the image forming units 11K, 11C, 11M, 11Y, respectively. These four image forming units 11 have the same configuration except for toner used therein as developer. The internal configurations of the image forming units 11 are thus described by using the image forming unit 11K for black (K) as an example.

The image forming unit 11K includes a photosensitive drum 12K that carries a toner image, a charge roller 41 that uniformly charges a surface of the photosensitive drum 12K, the exposure device 16K that includes a LED array configured to form an electrostatic latent image on the uniformly-charged surface of the photosensitive drum 12K, a development roller 42 that forms a toner image on the electrostatic latent image by means of triboelectric charging, a toner supply roller 43 that supplies the toner to the development roller 42, a cleaning blade 44 that scrapes off the toner remaining on the surface of the photosensitive drum 12K after transfer, and the like.

In the four image forming units 11, transfer devices or transfer rollers 13K, 13C, 13M, 13Y (when there is no need to distinguish the transfer rollers, they are sometimes referred to as transfer rollers 13) are arranged to be in pressure-contact with photosensitive drums 12K, 12C, 12M, 12Y (when there is no need to distinguish the photosensitive drums, they are sometimes referred to as photosensitive drums 12), respectively, with the conveyance belt 14 therebetween.

The conveyance belt 14 is driven while being laid between a drive roller 26 and an idle roller 27 in a tensioned state, and conveys the recording sheets 47 in a conveyance direction indicated by the arrow A. While the conveyance belt 14 conveys each recording sheet 47 in the direction of the arrow A, the toner images of the respective colors formed on the photosensitive drums 12K, 12C, 12M, 12Y are sequentially transferred onto the recording sheet 47 one on top of another by the transfer rollers 13K, 13C, 13M, 13Y facing the photosensitive drums 12K, 12C, 12M, 12Y, and a color toner image is formed.

A fixation device 3 is arranged in a rear stage of the image forming unit 11Y. The fixation device 3 is a belt heating device and includes a pressure roller 30 being a second roller and a fixation belt unit 31. The fixation device 3 may be disposed integrally with the main body of the image forming apparatus 1 or installed to be attachable to and detachable from the main body of the image forming apparatus 1. The fixation device 3 receives the recording sheet 47 on which the toner image is transferred to fuse the toner image to the recording sheet 47 by means of pressure application and heat processing as described later, and then discharges the recording sheet 47. Note that the fixation device 3 is described in further detail later.

The sheet feed cassette 18 is arranged in the lower portion of the image forming apparatus 1 and houses the recording sheets 47. A sheet feed mechanism is arranged adjacent to a front end of the sheet feed cassette 18. The sheet feed mechanism includes sheet feed rollers 19*a*, 19*b* and a separation piece 20 and feeds the recording sheets 47 one by one while separating the recording sheets 47 from one another. Each of the sent-out recording sheets 47 passes a sheet sensor 32 and is sent to a conveyance roller pair 21. The conveyance roller pair 21 is rotated by a sheet feed conveyance drive controller 104 (FIG. 4) from a moment when the recording sheet 47 passes the sheet sensor 32, and sends out the recording sheet 47 without stopping it.

The recording sheet 47 sent out by the conveyance roller pair 21 passes a sheet sensor 33 and is sent to a registration roller pair 22. The registration roller pair 22 starts to be rotated by the sheet feed conveyance drive controller 104 (FIG. 4) after a certain time elapses from the time point at which the recording sheet 47 passes the sheet sensor 33. Accordingly, the recording sheet 47 is pushed into a pressure contact portion of the registration roller pair 22 while being slightly warped, and skew of the recording sheet 47 is thereby corrected. The recording sheet 47 sent out from the registration roller pair 22 passes a write sensor 34 and is sent to the conveyance belt 14. A series of image forming operations by the image forming units 11 and the like are performed in synchronization with timing of detection by the write sensor 34.

The recording sheet 47 discharged by the fixation device 3 passes a sheet sensor 35 to be conveyed by a conveyance roller pair 23 and is then further discharged to the stacker 28 by a discharge roller pair 24. The conveyance roller pair 23 and the discharge roller pair 24 are made to rotate by the sheet feed conveyance drive controller 104 (FIG. 4) from a moment when the recording sheet 47 passes the sheet sensor 35, and send out the recording sheet 47 without stopping it.

Moreover, a sheet thickness detection sensor 25 is attached at a position facing the registration roller pair 22. The sheet thickness detection sensor 25 can measure the thickness of the conveyed sheet and an output thereof is inputted into a controller 101 to be described later.

Figure 2:
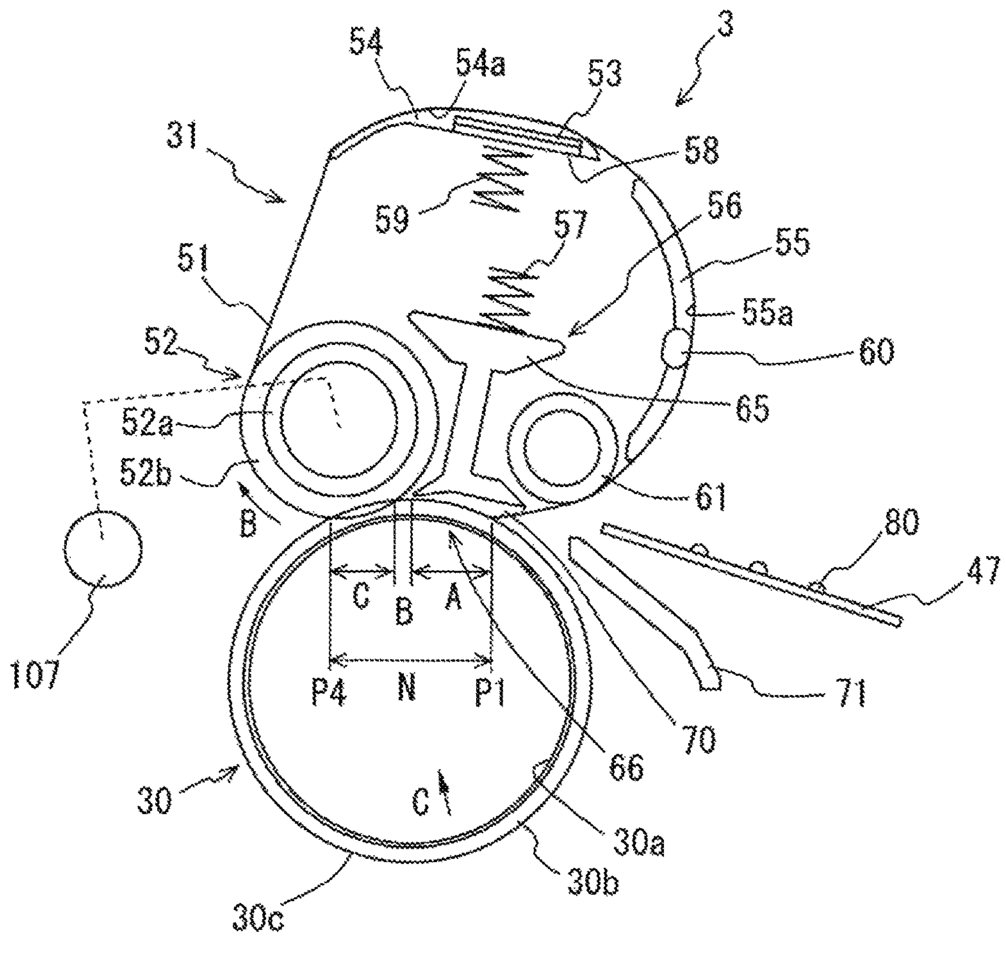
FIG. 2 is a configuration diagram of a main portion of a fixation device in one or more embodiments.

Next, the configuration of the fixation device 3 is further described. FIG. 2 is a configuration diagram of a main portion of the fixation device 3 in one or more embodiments.

As illustrated in FIG. 2, the fixation device 3 includes the fixation belt unit 31 and the pressure roller 30 being the second roller, and a nip portion 70 with a width N is formed by pressure contact between the fixation belt unit 31 and the pressure roller 30.

The fixation belt unit 31 is configured such that, in a fixation belt 51 being an endless belt member, there are arranged a fixation roller 52 being a first roller, a heater 53, a heater holder 54 serving also as a guide for the fixation belt 51, a belt guide 55, an auxiliary guide member 61, and a pad 56 being a pressure member. Note that the heater 53 and the heater holder 54 correspond to a heating member.

The fixation belt 51 moves in the same direction as the fixation roller 52 with the rotation of the fixation roller 52 in the direction of the arrow B. The pad 56 is arranged adjacent to and upstream of the fixation roller 52 in the movement direction of the fixation belt 51. The auxiliary guide member 61 that guides the fixation belt 51 between the pad 56 and the belt guide 55 is arranged upstream of the pad 56 and downstream of the belt guide 55. Note that a not-illustrated annular flange member including a flange that restricts offset of the fixation belt 51 in the width direction is further arranged upstream of the pad 56. In this configuration, the auxiliary guide member 61 is formed of a roller.

The fixation belt 51 is supported by the fixation roller 52, the heater holder 54, the belt guide 55, the pad 56, and the auxiliary guide member 61 in a tensioned manner to be rotationally movable, and rotationally moves along an outer surface 54*a* of the heater holder 54, a surface of the belt guide 55, and the like. The movement of the tensioned fixation belt 51 with the rotation of the later-described fixation roller 52 in the direction of the arrow B is sometimes referred to as rotating movement.

The pressure roller 30 is arranged to face the fixation roller 52 and the pad 56 of the fixation belt unit 31 with the fixation belt 51 therebetween. A not-illustrated pressing mechanism presses the pressure roller 30 at certain pressing force in the direction of the arrow C which is a direction toward the center of the fixation roller 52.

The pad 56 is biased by pad springs 57 or biasing members in such a direction that the pad 56 presses the pressure roller 30 via the fixation belt 51, the pad springs 57 such as compression coil springs laid between the pad 56 and a main body of the fixation device 3 in a compressed manner. By this configuration, the nip portion 70 having the certain width N in the sheet conveyance direction is formed between the fixation belt unit 31 and the pressure roller 30. Note that the width N of the nip portion 70 corresponds to a distance from an upstream end portion of the pressure contact portion between the pad 56 and the pressure roller 30 to a downstream end portion of the pressure contact portion between the fixation roller 52 and the pressure roller 30 in the sheet conveyance direction.

The heater holder 54 is in the fixation belt 51 to be opposite to and spaced away from the fixation roller 52 and the pad 56 facing the pressure roller 30. The outer surface 54*a* of the heater holder 54 that has a substantially arc shaped cross section is arranged to extend in the width direction of the fixation belt 51 to guide the fixation belt 51 by coming into contact with the inner side of the fixation belt 51. The heater holder 54 is made of a highly-heat resistant resin such as polyether ether ketone (PEEK) or liquid crystal polymer (LCP) or a metal with high thermal conductivity such as copper or aluminum alloy. Note that the width direction of the fixation belt 51 is sometimes referred to as a longitudinal direction hereafter.

A groove for fitting the heater 53 that extends in the longitudinal direction is formed on an inner surface portion of the heater holder 54 opposite to the outer surface 54*a* in contact with the fixation belt 51. The heater 53 is arranged in this groove portion.

Figure 3:
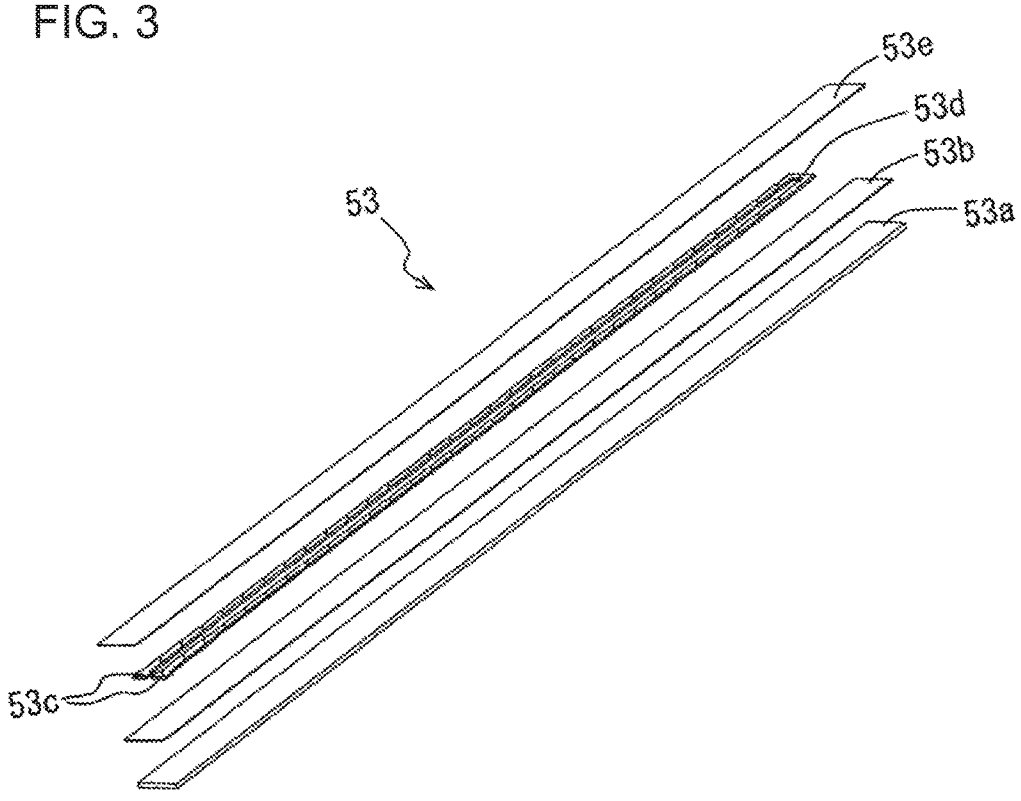
FIG. 3 is an exploded perspective view of a heater formed in a flat shape.

FIG. 3 is an exploded perspective view of the heater 53 formed in a flat shape. As illustrated in FIG. 3, the heater 53 is a flat heater in which an electrically insulating layer 53*b* made of glass or the like is provided on a substrate 53*a* made of stainless steel or ceramic and a resistance heating element 53*b* including electrodes 53*c* is formed on the electrically insulating layer 53*b* to be protected by a protection layer 53*e*. Material such as nickel-chrome alloy or sliver-palladium alloy can be used for the resistance heating element 53*b*. Moreover, glass coating of pressure-resistant glass is applied to the protection layer 53*e*.

The heater 53 is fixedly supported in the groove portion of the heater holder 54 with a gap therebetween being filled with heat-resistant grease in the longitudinal direction, and the groove portion is closed by a pressure plate 58 arranged to cover a surface of the heater 53. The heater holder 54 is biased by a heater spring 59 in such a direction that the fixation belt 51 is tensioned, the heater spring 59 being a compression coil spring or the like laid between the main body of the fixation device 3 and the pressure plate 58 in a compressed manner.

The belt guide 55 is located downstream of the heater holder 54 in the fixation belt 51. An outer surface 55*a* of the belt guide 55 having a substantially-arc shaped cross section is arranged to extend in the width direction of the fixation belt 51 to guide the fixation belt 51 by coming into contact with the inner side of the fixation belt 51. The belt guide 55 is molded by using LCP, polyphenylene sulfide (PPS), or the like. It is desirable that the outer surface 55*a* being a surface on which the fixation belt 51 slides is provided with a rib shape or the like to reduce the contact area with the fixation belt 51 and thereby reduce heat taken away from the fixation belt 51. Moreover, a belt temperature sensor 60 that detects the temperature of an inner peripheral surface of the fixation belt 51 is incorporated in the belt guide 55.

The belt temperature sensor 60 is arranged on the belt guide 55, adjacent to and upstream of the nip portion 70 with the width N in the rotating movement direction of the fixation belt 51, and detects the temperature of the inner peripheral surface of the fixation belt 51 by coming into sliding contact with the inner peripheral surface.

The pad 56 includes a supporting base member 65 made of metal such as iron or aluminum alloy and a heat-resistant elastic member 66 fixedly bonded to the supporting base member 65. Furthermore, a sliding layer for reducing friction resistance with the inner peripheral surface of the fixation belt 51 is formed on a surface of the heat-resistant elastic member 66. The multiple pad springs 57 are arranged in the longitudinal direction of the pad 56 and are configured such that the pressure is even in the longitudinal direction. Note that the width N of the nip portion 70 can be changed by changing the length of the contact surface of the pad 56 with the pressure roller 30.

The fixation belt 51 formed to be endless is a flexible member in which a heat-resistant elastic layer made of silicone rubber, fluoropolymer resin, or the like is provided on an outer peripheral surface of a cylindrical belt base member formed by heat-resistant nickel (Ni) electroforming or made of material such as polyimide (PI) or stainless steel (SUS304) and a release layer made of fluoropolymer resin or the like is formed on an outer peripheral surface of the elastic layer. The fixation belt 51 rotationally moves in the same direction as the fixation roller 52 with the rotation of the fixation roller 52 in the direction of the arrow B by means of friction force generated in the nip portion 70 with the width N by the rotation of the fixation roller 52, and is heated by the heater 53.

In the fixation roller 52, a heat-resistant elastic layer 52*b* made of silicone rubber, fluoropolymer resin, or the like is formed on a metal core 52*a* extending in the longitudinal direction and formed of a pipe or a shaft made of metal such as iron or aluminum alloy. The fixation roller 52 is rotatably supported on not-illustrated bearings and is rotationally driven in the direction of the arrow B by drive force transmitted from a fixation motor 107 (see FIG. 4) to a not-illustrated fixation roller gear provided on the metal core 52*a*.

In the pressure roller 30, a heat-resistant elastic layer 30*b* made of silicone rubber, fluoropolymer resin, or the like and a release layer 30*c* made of fluoropolymer resin or the like are formed on a metal core 30*a* extending in the longitudinal direction and formed of a pipe or a shaft made of metal such as iron or aluminum alloy. The pressure roller 30 is rotatably held by a not-illustrated pressing mechanism and is biased in the direction of the arrow C which is the direction toward the center of the fixation roller 52.

The pressure roller 30 thereby rotates by following the rotating movement of the fixation belt 51 that rotate by following the fixation roller 52 due to friction force generated in the nip portion 70 with the width N by the rotation of the fixation roller 52. The recording sheet 47 on which the toner 80 is transferred is conveyed while being guided by a sheet guide portion 71 formed along the sheet conveyance route 4, and enters the nip portion 70 with the width N by riding over a front end of the sheet guide portion 71.

The members of the fixation device 3 are further described.

The heater holder 54 is an integral holder formed by extruding aluminum A6063, and the pressure plate 58 is formed of an aluminum A5052 plate with a thickness of 1 mm.

The pressure roller 30 is a roller with an outer diameter of 40 mm (radius of 20 mm) which are configured as follows: the metal core 30*a* is an iron (STKM) pipe with a diameter of 33.6 mm, a thickness of 0.7 mm, and a length of 350 mm; a silicone rubber foam (sponge) layer with a thickness of 1 mm is formed on the outer peripheral surface of the metal core 30*a* as the elastic layer 30*b*; and a perfluoro vinyl ether copolymer (PFA) resin tube with a thickness of 30 μm covers the surface of the elastic layer 30*b* as the release layer 30*c*. Moreover, the roller product is configured to have the hardness of ASKER-C75.

The fixation roller 52 is a roller with an outer diameter of 22 mm which are configured as follows: the metal core 52*a* is an iron (STKM) pipe with a diameter of 21 mm, a thickness of 1.5 mm, and a length of 350 mm; and a silicone rubber foam (sponge) layer with a thickness of 2 mm is formed on the outer peripheral surface of the metal core 52*a* as the elastic layer 52*b*. The roller product is configured to have the hardness of ASKER-C60. Note that the fixation roller 52 has such a crown shape that the outer diameter in a center portion is larger than the outer diameters at both ends by 0.3 mm to make distribution of pressure between the fixation roller 52 and the pressure roller 30 even in the longitudinal direction.

The pad 56 is configured such that: the supporting base member 65 is made of aluminum alloy (A6063); the heat-resistant elastic member 66 is made of silicone rubber and is coated with a silicone-based resin containing graphite at a thickness of 30 μm as the sliding layer; and the length of a nip region A in the case where a facing surface 67 (FIG. 6) comes into contact with the pressure roller 30 with the radius of 20 mm is set to 6 mm. The hardness of the silicone rubber is set to JISA40. Moreover, the facing surface 67 (FIG. 6) has such a shape that a center portion protrudes by 0.2 mm with respect to both ends to make the distribution of pressure between the fixation roller 52 and the pressure roller 30 even in the longitudinal direction.

Although the sliding layer is configured as coating in this example, the heat-resistant elastic member 66 may be covered with a fluoropolymer resin sheet. Moreover, a gap between the pad 56 and the fixation roller 52 in the nip portion 70 with the width N (corresponding to a nip region B (low pressure region)) to be described later is set to about 1 mm.

The fixation belt 51 is an endless belt configured such that: a cylindrical member made of polyimide (PI) resin and having a thickness of 80 μm is used as the belt base member; a silicone rubber layer with a thickness of 200 μm is provided as the elastic layer; and a PFA resin layer with a thickness of 20 μm is formed as the release layer. Moreover, when the belt peripheral length of the fixation belt 51 is long, the heating time is long. Meanwhile, when the belt peripheral length is short, there is not enough space in the fixation belt 51 and the fixation roller and the pad base member respectively with the outer diameter and the size necessary for securing the nip width cannot be arranged. Accordingly, in view of the configuration of the fixation roller 52 and the pad 56 described above, the fixation belt 51 has an inner diameter of 49 mm and a length (width) of 350 mm.

The pressure roller 30 is set to be pressed by the not-illustrated pressing mechanism against the fixation roller 52 at pressing force of 30 kgf in the direction of the arrow C which is the direction toward the center of the fixation roller 52. Furthermore, the pad 56 is set to press the pressure roller 30 at a total load of 10 kgf by means of the multiple pad springs 57 arranged in the longitudinal direction. By this configuration, the nip widths can be set such that the width of a nip region C formed by the pressure roller 30 and the fixation roller 52 is 6 mm and the width of the nip region A formed by the pressure roller 30 and the pad 56 is 6 mm. The width N of the nip portion 70 in this case is set to about 12 to 14 mm.

Figure 4:
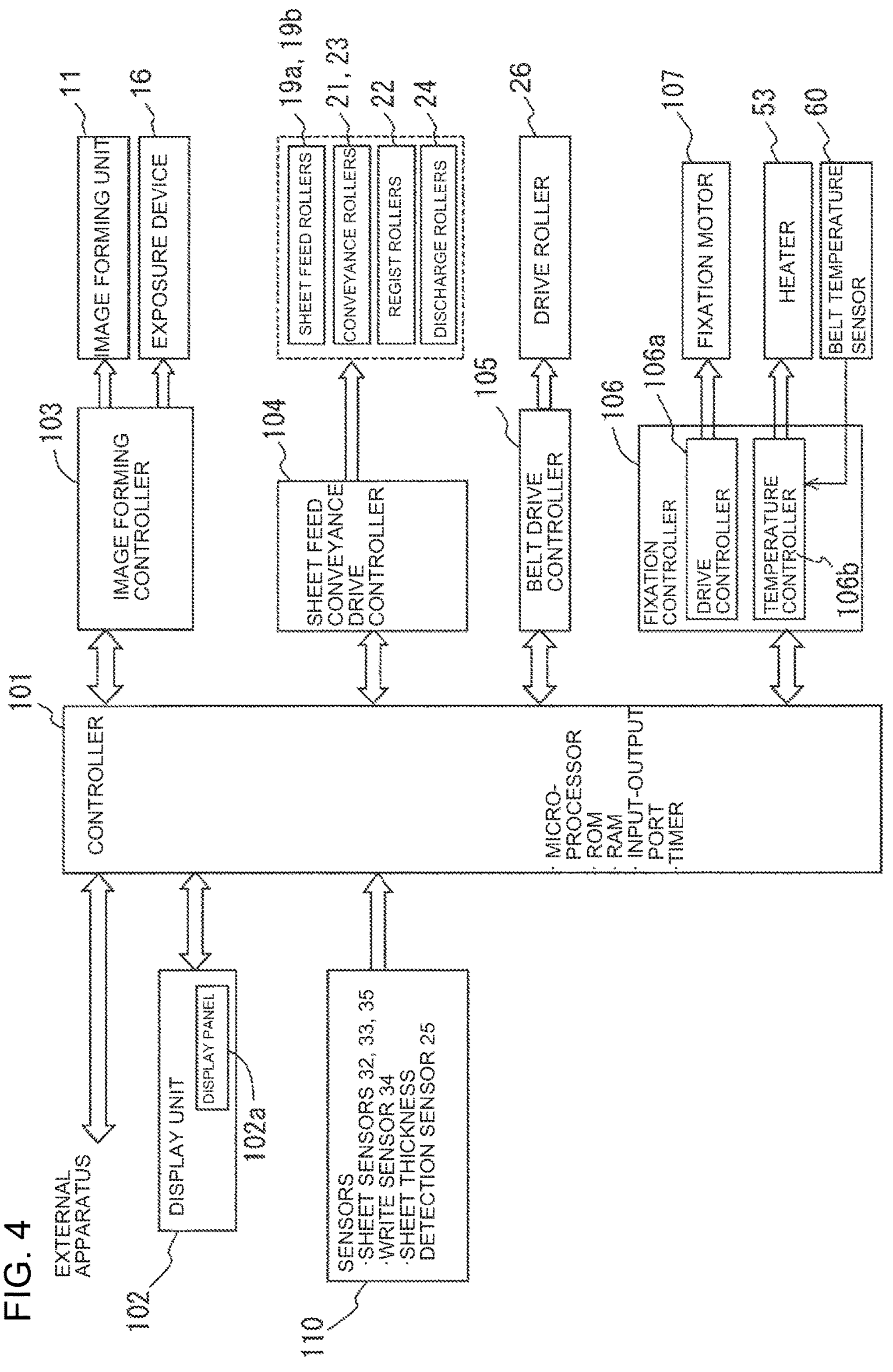
FIG. 4 is a block diagram of a control system of the image forming apparatus.

FIG. 4 is a block diagram of a control system of the image forming apparatus 1.

In FIG. 4, the controller 101 is configured by a microprocessor, a ROM, a RAM, an input-output port, a timer, and the like. The controller 101 receives a print instruction from a higher-level apparatus, notifies the condition of the image forming apparatus 1, and controls all operations relating to the print operation. A display unit 102 displays data indicating operations contents and various setting conditions of the apparatus on a display panel 102*a*, based on an instruction from the controller 101. A sensor group 110 that includes sensors such as the sheet sensors 32, 33, 35, the write sensor 34, the sheet thickness detection sensor 25 described in FIG. 1 sends detection data detected by the sensors to the controller 101.

An image forming controller 103 controls drive of the image forming units 11 and light emission of the exposure devices 16 based on instructions from the controller 101. A belt drive controller 105 controls rotational drive of the drive roller 26 to rotationally move the conveyance belt 14 (FIG. 1) based on an instruction from the controller 101. A sheet feed conveyance drive controller 104 controls rotational drive of the sheet feed rollers 19*a*, 19*b*, the conveyance roller pairs 21, 23, the registration roller pair 22, and the discharge roller pair 24 illustrated in FIG. 1 based on an instruction from the controller 101 to feed and convey the recording sheets 47. A fixation controller 106 controls drive of fixation processing (heating and pressure application) operations by the fixation device 3 based on an instruction from the controller 101.

The fixation controller 106 including a drive controller 106*a* and a temperature controller 106*b* is further described with reference to FIG. 2. The fixation belt 51 is heated by heat generated by the heater 53. In this case, the surface temperature of the fixation belt 51 is detected by the belt temperature sensor 60 such as a thermistor and is sent to the temperature controller 106*b*. The temperature controller 106*b* controls on-off of the heater 53 based on an instruction from the controller 101 such that the detected surface temperature of the fixation belt 51 is maintained at a preset temperature.

The fixation roller 52 rotates in the direction of the arrow B to convey the recording sheet 47 in the conveyance direction by receiving the drive force from the fixation motor 107 at the gear connected to an end portion of the metal core 52*a*. The drive controller 106*a* controls rotation of the fixation motor 107 based on an instruction from the controller 101 and the controller 101 instructs the fixation controller 106 to start fixation apparatus control based on information from a user or a PC.

Description is given of operations in the image forming apparatus 1 in printing in the aforementioned configuration. Upon receiving a print command from the higher-level apparatus, the controller 101 of the image forming apparatus 1 starts printing according to the print command. First, the recording sheets 47 housed in the sheet feed cassette 18 are separated from one another and sent out to the sheet conveyance route 4 one by one by the sheet feed rollers 19*a*, 19*b* and the separation piece 20. Next, each recording sheet 47 is subjected to skew correction by the conveyance roller pair 21 and the registration roller pair 22 and then conveyed to the conveyance belt 14.

In synchronization with this, the controller 101 applies a preset certain voltage to the transfer rollers 13 and the rollers in the image forming units 11, uniformly charges the surfaces of the photosensitive drums 12 by using charge voltage applied to the charge rollers 41 in the image forming units 11, causes the exposure devices 16 to emit light according to image information based on the print command to expose the surfaces of the photosensitive drums 12 and form electrostatic latent images on the surfaces, and develops the electrostatic latent images on the photosensitive drums 12 by attaching thereto the toner 80 supplied from the toner supply rollers 43 with the development rollers 42 to form toner images of the respective colors on the surfaces of the photosensitive drums 12.

Thereafter, the recording sheet 47 is conveyed to the image forming units 11 by the conveyance belt 14. When the recording sheet 47 passes between the photosensitive drums 12 of the respective colors and the transfer rollers 13 corresponding thereto, the toner images of black (K), cyan (C), magenta (M), and yellow (Y) are sequentially transferred onto the recording sheet 47 by using the transfer voltage applied to the transfer rollers 13, and a color toner image is formed.

When the recording sheet 47 on which the toner image is transferred is conveyed to the fixation device 3, the fixation device 3 fuses the toner image onto the recording sheet 47. The recording sheet 47 to which the toner image is fused is conveyed along the sheet conveyance route 4 by the conveyance roller pair 23 and is discharged to the stacker 28 on the upper cover 17 by the discharge roller pair 24, and the print operation is completed.

The fixation operation of the fixation device 3 in this printing is further described with reference to mainly FIG. 2.

First, with the start of the print operation in the image forming apparatus 1, the controller 101 causes the drive controller 106*a* of the fixation controller 106 to rotate the fixation motor 107 such that the fixation motor 107 rotates the fixation roller 52 in the direction of the arrow B (FIG. 2) via a not-illustrated gear train arranged in the main body of the image forming apparatus 1 and the not-illustrated gear provided on the metal core 52*a* of the fixation roller 52. The friction force generated in the nip portion 70 with the width N by this rotation of the fixation roller 52 causes the fixation belt 51 to follow the fixation roller 52 and rotate (rotationally move).

The controller 101 simultaneously causes the temperature controller 106*b* of the fixation controller 106 to control on-off of the heater 53 such that the heater 53 generates heat and heats the fixation belt 51 from the inner peripheral side. The temperature of the fixation belt 51 heated by the heater 53 is detected by the belt temperature sensor 60 and this temperature information is transmitted to the temperature controller 106*b*. The temperature controller 106*b* controls on and off of power supplied to the heater 53 based on the temperature detected by the belt temperature sensor 60 to maintain the surface temperature of the fixation belt 51 to a certain fixation temperature.

When the recording sheet 47 on which the toner image is transferred is conveyed to the fixation device 3 with the surface temperature of the fixation belt 51 maintained at the certain temperature, the recording sheet 47 is held via the fixation belt 51 in the nip portion 70 with the width N which is formed of the pad 56 and the fixation roller 52 with the pressure roller 30. The Heating at the certain fixation (fusing) temperature by the fixation belt 51 and the pressure application at the certain pressing force causes the toner image to be fused onto the recording sheet 47.

From the view point of preventing excessive temperature rise of the fixation belt, it is desirable that the rotation of the fixation roller 52 is started as soon as the heater is turned on. In one embodiment, the rotation of the fixation roller 52 is set to be started simultaneously with the turn-on of the heater. Moreover, the target temperature of the fixation belt 51 in this description is set to 160° C. and, while the fixation (the fusing) is executed after the turn-on of the heater 53, the temperature controller 106*b* performs such control that the temperature of the fixation belt 51 is within a certain temperature range whose central value is this target temperature.

Figure 5:
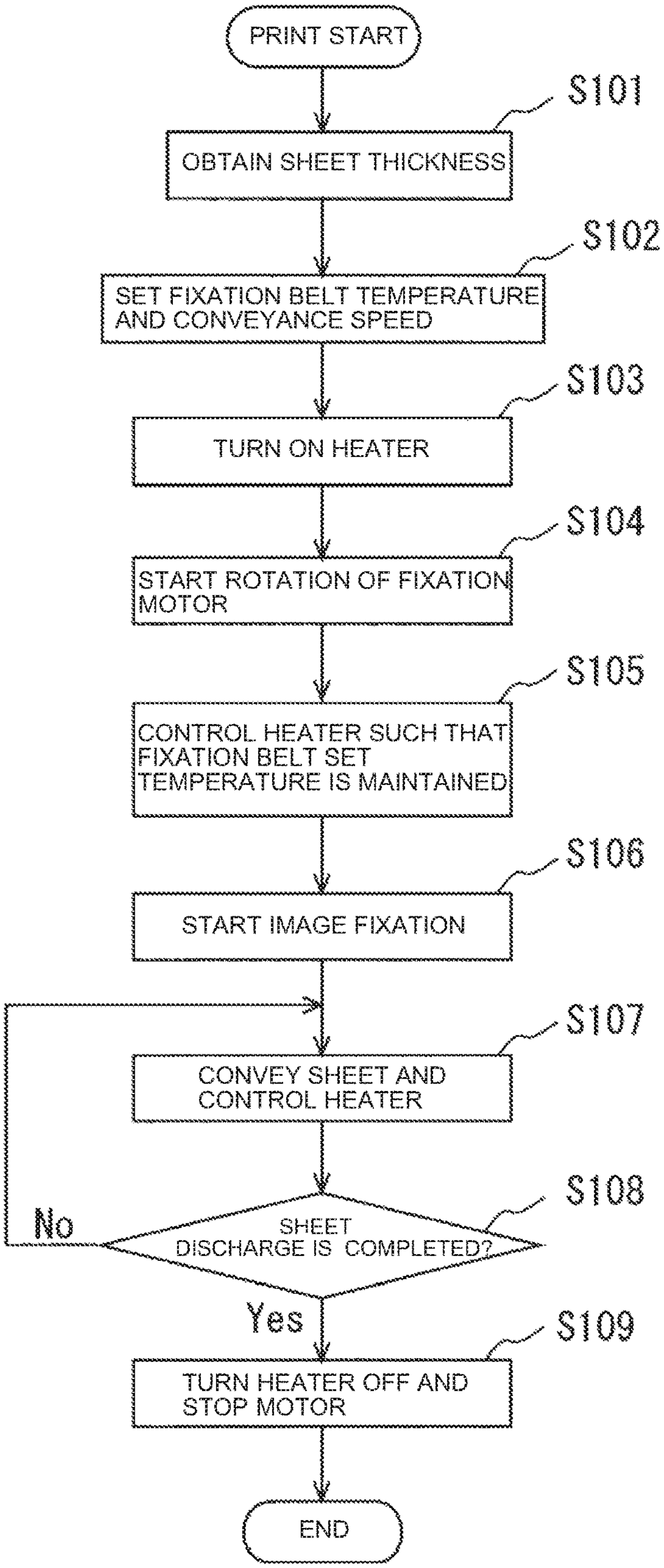
FIG. 5 is a flowchart illustrating a flow of control of the fixation device by a controller.

FIG. 5 is a flowchart illustrating a flow of control of the fixation device 3 by the controller 101. The control of the fusing device 3 is further described with reference to this flowchart.

After the start of the print operation, the controller 101 obtains the sheet thickness information of the conveyed recording sheet 47 from the sheet thickness detection sensor 25 to check the sheet thickness (step S101) and sets the fixation (fusing) temperature and the sheet conveyance speed suitable for the thickness of the recording sheet 47 (step S102). After the setting of the parameters, the temperature controller 106*b* starts feeding electricity to the heater 53 (step S103) and, at the same time, the drive controller 106*a* starts the rotational drive of the fixation motor 107 at the set rotation (step S104). Note that, in this description, a sheet having a normal thickness and a sheet grammage of 80 g/m$^2$ is used as the recording sheet 47, the conveyance speed in the fixation operation is set to 50 ppm, and the target temperature of the fixation belt 51 in the fixation operation is set to 165° C.

Thereafter, the temperature controller 106*b* performs the on-off control of the heater 53 such that the temperature of the fixation belt 51 detected by the belt temperature sensor 60 is maintained at the target temperature (165° C.) of the fixation belt 51 (step S105), and the toner image fixation operation is started (step S106).

Then, the rotation drive control of the fixation motor 107 and the temperature control by turning on and off the heater 53 are continued until the recording sheet 47 to which the image is fused passes the sheet sensor 35 (FIG. 1) and the discharge of the recording sheet 47 from the fixation device 3 is confirmed (step S107, step S108, No). When the discharge of the recording sheet 47 from the fixation device 3 is confirmed (step S108, Yes), the rotation drive control and the temperature control are stopped (step S109) and the fixation operation by the fixation device 3 is terminated.

Figure 6A:
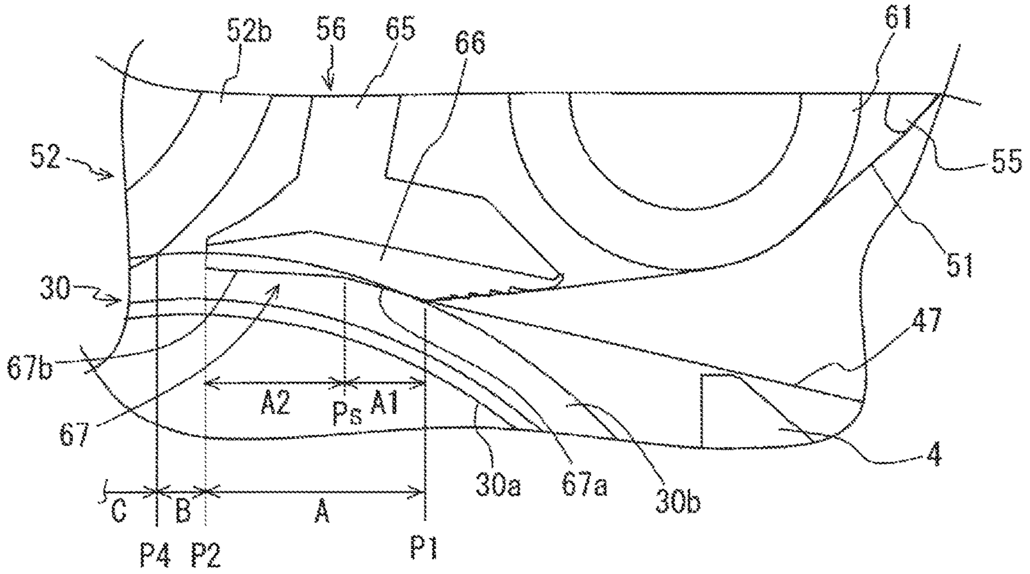
FIG. 6A is a partially enlarged view of a nip region formed by a pressure roller and a pad and the vicinity of the nip region.
Figure 6B:
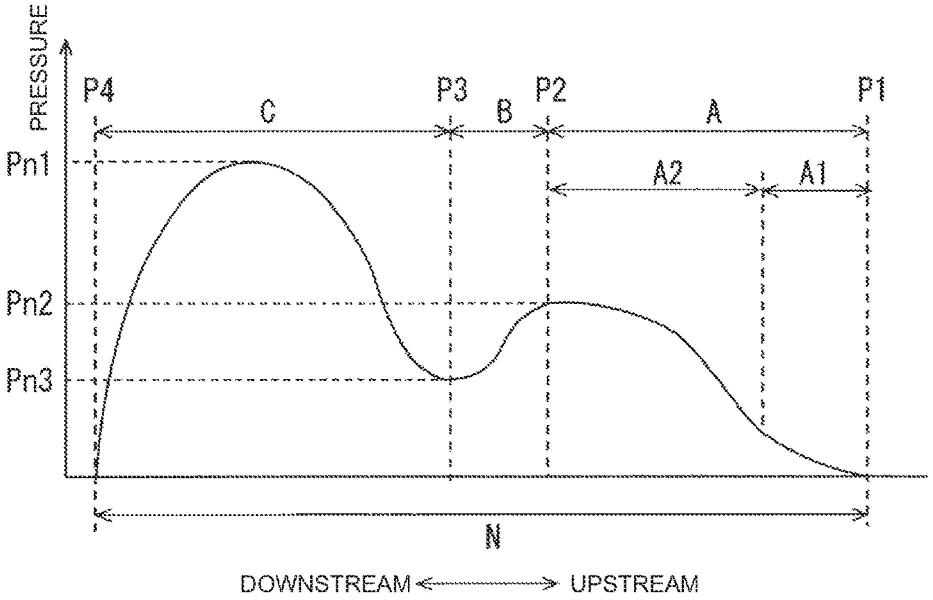
FIG. 6B is a graph illustrating distribution of pressure over the entire region of a nip portion with a width N.

Next, description is given below of the shape of the pad 56, the distribution of the pressure, and the like in the nip portion 70 with the width N (FIG. 2) which is formed of the pad 56, the fixation roller 52, and the pressure roller 30 with the fixation belt 51 provided between the pressure roller 30 and each of the pad 56 and the fixation roller 52. FIG. 6A is a partially enlarged view of the nip region A formed of the pressure roller 30 and the pad 56 and the vicinity of the nip region A, and FIG. 6B is a graph illustrating the distribution of pressure over the entire region of the nip portion 70 with the width N.

As illustrated in FIG. 6A, in the heat-resistant elastic member 66 fixedly arranged in the front end portion of the pad 56, the facing surface 67 facing the pressure roller 30 is formed of a first flat section 67*a* and a second flat section 67*b* which are formed to substantially extend along an arc of the pressure roller 30 in a shape of the heat-resistant elastic member 66 along a cross-section perpendicular to the longitudinal direction. Moreover, the first flat section 67*a* and the second flat section 67*b* form an intersecting portion Ps in which the first flat section 67*a* and the second flat section 67*b* intersect each other at an obtuse angle and which linearly extends in the longitudinal direction, and the facing surface 67 comes into pressure contact with the pressure roller 30 to form the nip region A. Moreover, it is assumed that the sliding layer is formed on the facing surface 67 by coating as described above.

In FIG. 6A, although the nip portion between the pressure roller 30 and the heat-resistant elastic member 66 in the nip region A is illustrated as a region where the undeformed pressure roller 30 and the undeformed heat-resistant elastic member 66 overlap each other, the pressure roller 30 and the heat-resistant elastic member 66 are actually in pressure contact with each other with the fixation belt 51 therebetween and are elastically deformed in the pressure contact portion. Moreover, a depth of overlap assumed to be formed between the undeformed pressure roller 30 and the undeformed heat-resistant elastic member 66 in each portion of the nip region A is sometimes referred to as a nip amount.

As described above, the nip region A is formed by the pressure contact of the heat-resistant elastic member 66 of the pad 56 with the pressure roller 30 with the fixation belt 51 therebetween, and the nip region C (FIG. 2) is formed by the pressure contact of the pressure roller 30 with the fixation roller 52 with the fixation belt 51 therebetween. The nip region B (low pressure region) is formed between the nip region A and the nip region C by low pressure generated by pressing of the fixation belt 51 against the pressure roller 30.

FIG. 6B illustrates the distribution of pressure generated between the fixation belt 51 and the pressure roller 30 in the sheet conveyance direction in the nip portion 70 with the width N (FIG. 2). As illustrated in FIGS. 6A and 6B, in a region A1 of the nip region A in which the first flat section 67*a* of the facing surface 67 of the heat-resistant elastic member 66 comes into contact with the pressure roller 30, the nip amount increases toward the downstream side at a relatively low increase rate, and the nip pressure thus gradually increases with the increase of the nip amount. Meanwhile, in a region A2 in which the second flat section 67*b* of the facing surface 67 of the heat-resistant elastic member 66 come into pressure contact with the pressure roller 30, the nip amount increases toward the downstream side at a relatively high increase rate, and the nip pressure thus abruptly increases with the increase of the nip amount, and the maximum nip pressure Pn2 is obtained at a downstream end portion P2 of the heat-resistant elastic member 66.

Meanwhile, in the nip region C, the maximum nip pressure is obtained at a center portion corresponding to a position on a line connecting the rotation center of the pressure roller 30 and that of the fixation roller 52, and the nip pressure decreases from the center portion toward both sides. Note that, at a position of an upstream end portion P3 of the nip region C, since the fixation belt 51 is pressed against the pressure roller 30 by the tension applied to the fixation belt 51, the nip pressure does not reach zero and is maintained at the minimum nip pressure Pn3 in the nip region B (low pressure region).

Note that, in this description, the maximum nip pressure Pn1 in the average pressure in the longitudinal direction in the entire nip region C (hereafter, simply referred to as the pressure in the nip region C) is set to 1.5 to 2.5 kgf/cm$^2$, the maximum nip pressure Pn2 in the nip region A is set to 0.8 to 1.5 kgf/cm$^2$, and the minimum nip pressure Pn3 in the nip region B is set to 0.5 kgf/cm$^2$.

Next, description is given of print test performed to study occurrence of toner image disturbance and rubbed print caused by the shape of the heat-resistant elastic member 66 in the pad 56. The print test is performed by preparing, as test samples, multiple pads 56 including heat-resistant elastic members 66 varying in the shape of the front end portion including the facing surface 67. Note that the heat-resistant elastic member 66 in the embodiment has a certain shape determined from the test result described later, but is sometimes described as one of the heat-resistant elastic members 66 being the test samples without being distinguished for the sake of convenience.

The heat-resistant elastic members 66 used as the test samples vary in the shape of the front end portion as described below but are formed based on the specifications described above in FIG. 2 regarding other matters such as materials and processing of the sliding layer.

Figure 7:
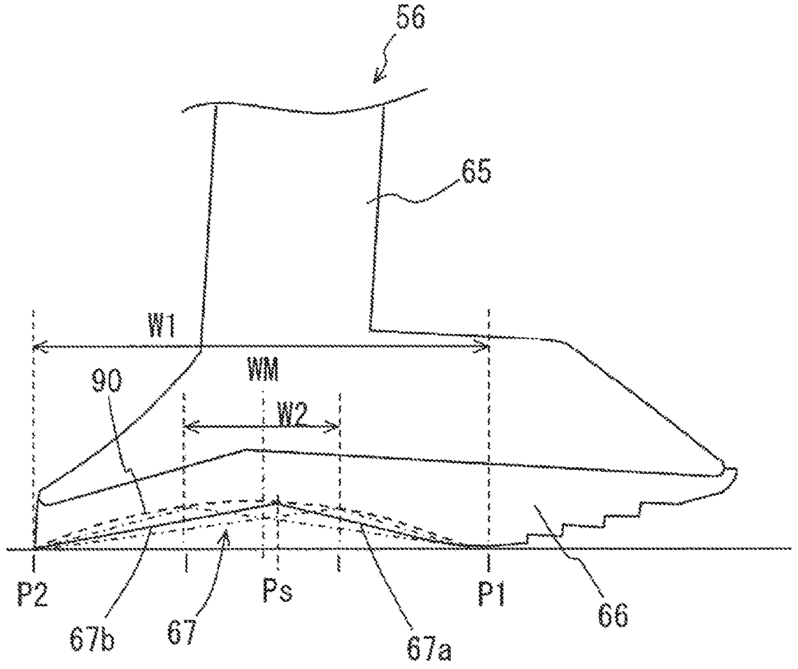
FIG. 7 is a diagram for explaining the shapes of heat-resistant elastic members in pads prepared as test samples.

FIG. 7 is a diagram for explaining the shapes of the heat-resistant elastic members 66 in the pads 56 prepared as the test samples. As illustrated in FIG. 7, each of the facing surfaces 67 of the heat-resistant elastic members 66 being the test samples includes the first flat section 67*a* and the second flat section 67*b* and is formed along an imaginary arc 90 with a radius R which is illustrated by a dotted line.

An upstream end portion P1 being a first end portion of the first flat section 67*a*, the downstream end portion P2 being a second end portion of the second flat section 67*b*, and the intersecting portion Ps in each of the facing surfaces 67 of the heat-resistant elastic members 66 are on the imaginary arc 90 with the radius R, and the intersecting portion Ps is set in a setting region with a width W2 whose center is at a center portion WM of a line connecting the upstream end portion P1 and the downstream end portion P2. The multiple pads 56 each including the heat-resistant elastic member 66 formed as described above are prepared as the test samples with the radius R of the imaginary arc 90 being a parameter.

The conditions of installing each of the pads 56 being the test samples in the fixation device 3 are set to be completely the same as those of the pad 56 described above in FIG. 2. Accordingly, each of the pads prepared as the test samples is set such that the supporting base member 65 thereof is biased toward the pressure roller 30 at the same angle and the same biasing force as those of the pad 56 illustrated in FIG. 2. Note that the pad 56 employed in FIG. 2 corresponds to the pad prepared as the test sample with the radius R of the imaginary arc 90 being set to 15 mm.

A measurement method and measurement conditions are described below.

A test apparatus with the same basic configuration as that of the image forming apparatus 1 illustrated in FIG. 1 is used for the test. The outer diameter of the pressure roller 30 is thus 40 mm (radius is 20 mm).

The pads 56 prepared as the test samples are installed in the apparatus in turns and monochrome solid printing with black (K) is performed for each pad 56. Then, a fixation rate is measured, and the toner image disturbance and the rubbed print are checked.

The fixation rate is measured, for example, in the following steps.

(1) The density of a predetermined portion of a printed recording sheet subjected to the monochrome solid printing with black (K) is measured by using a spectrodensitometer (for example, X-Rite 528 manufactured by X-rite, Inc.) as density before processing.

(2) A mending tape is attached to the measurement portion of the recording sheet subjected to measurement in (1). The mending tape is pressed at pressure of 500 g and then removed.

(3) The density of a portion where the mending tape is removed is measured by using the spectrodensitometer as density after processing.

(4) The fixation rate is obtained from the following equation: fixation rate=(density after processing/density before processing).

(5) The allowable range of the obtained fixation rate is set to 90% or more and the test sample with fixation rate of 90% or more is rated as OK.

The toner image disturbance and the rubbed print are checked visually to determine whether the toner image disturbance or the rubbed print has occurred.

Note that the toner image disturbance occurs in the process where: the recording sheet 47 to which the toner image is transferred enters the nip region A; the melted toner permeates the sheet and is fused; and then the sheet is discharged from the nip region A. Specifically, the toner image disturbance refers to the following failure. The toner that starts melting in the region of the pad 56 temporarily moves toward the fixation belt 51 in the low pressure portion after the pad portion, due to factors such as:

1. application of force to the toner by steam generated from the sheet; and
2. poor permeation of the toner into a sheet with high smoothness, and then moves to return to the recording sheet 47.

In this case, when the toner moves to a position different from the position before the movement, sheet exposure occurs in a portion which should be covered with the toner, and the image appears to be partially pale.

Moreover, the rubbed print refers to a smear mark which occurs when unfused toner comes into contact with the fixation belt 51 before reaching the nip region A. Specifically, the rubbed print refers to the following failure: when the recording sheet 47 comes too close to the fixation belt 51 and comes into contact therewith in the pad 56 portion before entering the nip region A, the unfused toner excessively melts under an insufficient pressure and is then fused after the melting. This causes the gloss of the toner surface in this portion to decrease and a gloss difference with other portions occurs.

Figure 8:
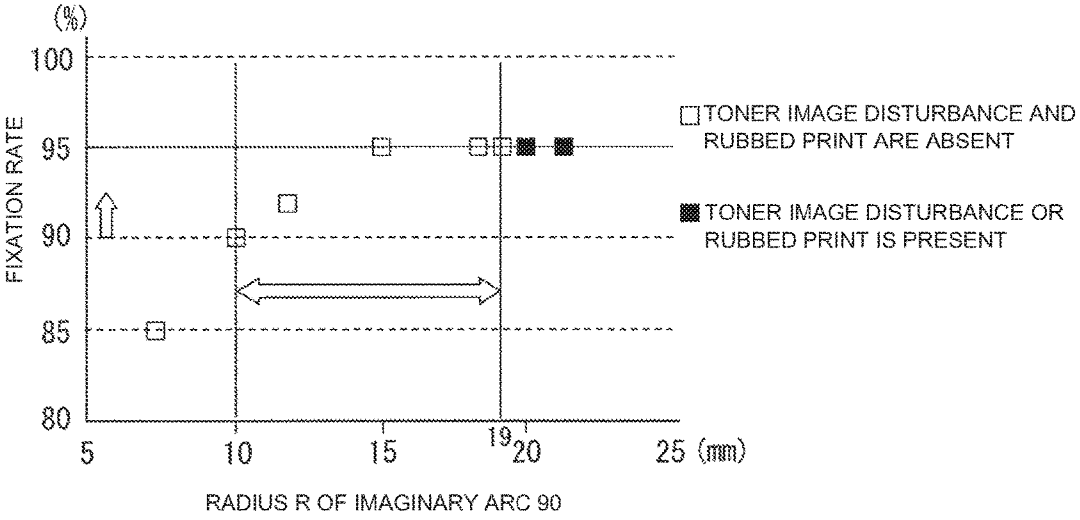
FIG. 8 is a graph illustrating print test results and ratings.

FIG. 8 is a graph illustrating the print test results and ratings. As illustrated in FIG. 8, in the graph whose vertical axis represents the fixation rate and whose horizontal axis represent the radius R of the imaginary arc 90 the positions of the test results of the respective test samples are indicated by symbols of □ and ■.

The symbol □ indicates that occurrence of the toner image disturbance or the rubbed print is not confirmed in the test using the corresponding sample and this sample is thus rated as acceptable.

The symbol ■ indicates that occurrence of at least one of the toner image disturbance and the rubbed print is confirmed in the test using the corresponding sample and this sample is thus rated as not acceptable.

Moreover, a fixation rate of 90% or more is determined as no problem (acceptable). Accordingly, as apparent from the graph of FIG. 8, it is found that the completely-acceptable test samples in which occurrence of the toner image disturbance or the rubbed print is not confirmed and whose fixation rate is 90% or more are in a range in which the radius R of the imaginary arc 90 is 10 mm or more and 19 mm or less. Here, a ratio of the radius R of the imaginary arc in this range to the radius Rp (20 mm) of the pressure roller 30 is expressed by:

$$(1/2)\times Rp \leq R \leq (19/20)\times Rp.$$

Moreover, in the test conducted by the inventors, when the width W2 of the setting region satisfies $$W2 < (1/3)\times W1,$$

where W1 is the distance from the upstream end portion P1 to the downstream end portion P2 in the facing surface 67 of the heat-resistant elastic member 66 illustrated in FIG. 1 (corresponding to the width N of the nip portion 70 in FIG. 2), the same test determination results are obtained for the test samples in which the radiuses R of the imaginary arcs 90 are the same and which include the heat-resistant elastic members 66 with the intersecting portions Ps set within the setting region W2.

Next, description is given of the case where the pad 56 is employed and the cases where pads of comparative example 1, 2 are employed.

Figure 9A:
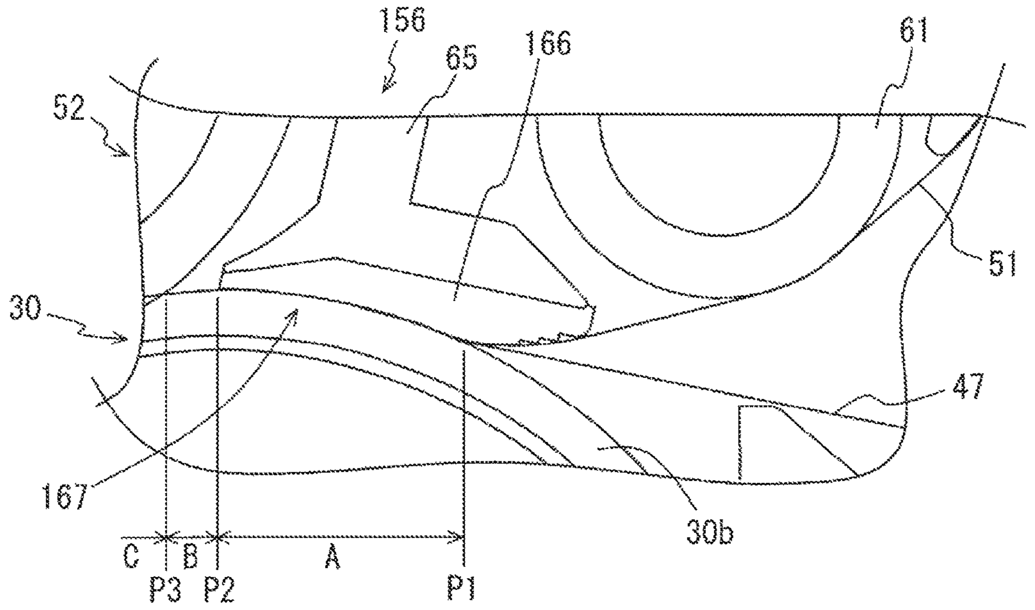
FIG. 9A is a main portion configuration diagram illustrating a configuration around the nip portion of a fixation device employing a pad in a comparative example 1.
Figure 9B:
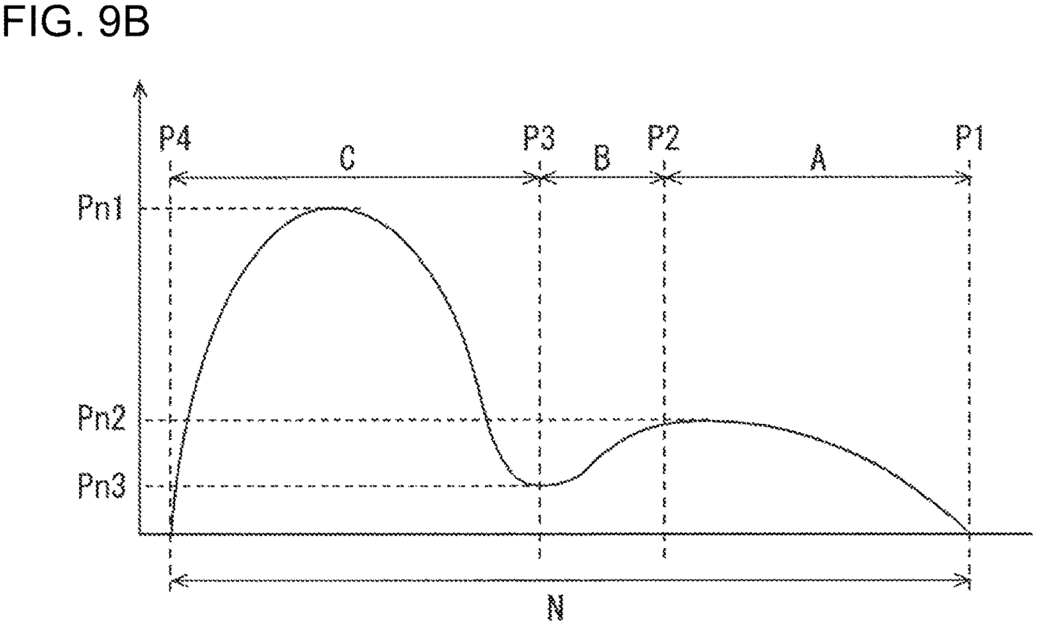
FIG. 9B is a graph illustrating distribution of pressure generated between the fixation belt and the pressure roller over the entire region of the nip portion in a comparative example 1.

FIG. 9A is a main portion configuration diagram illustrating a configuration around the nip portion 70 (see FIG. 2) of a fixation device being a comparative example 1 and employing a pad 156, and FIG. 9B is a graph illustrating distribution of pressure generated between the fixation belt 51 and the pressure roller 30 over the entire region of the nip portion. The fixation device being a comparative example herein is different from the fixation device 3 (see FIG. 2) in that a heat-resistant elastic member 166 having a shape different from that of the heat-resistant elastic member 66 is used and in that conditions of pressure contact of the heat-resistant elastic member 166 with the pressure roller 30 are different from the conditions of pressure contact of the heat-resistant elastic member 66 with the pressure roller 30. However, other portions are the same.

As illustrated in FIG. 9A, in this comparative example, a facing surface 167 of the heat-resistant elastic member 166 of the pad 156 is formed in an arc shape and the radius of this arc is formed to be 20 mm which is the same as the radius Rp (20 mm) of the outer shape of the pressure roller 30. The heat-resistant elastic member 166 is attached such that the pressure contact force in the downstream end portion P2 is somewhat greater than that in the upstream end portion P1.

In this case, as illustrated in FIG. 9B, the maximum nip pressure Pn2 in the nip region A in which the heat-resistant elastic member 166 comes into contact with the pressure roller 30 and the minimum nip pressure Pn3 in the nip region B (low pressure region) are both lower those in the embodiment. Accordingly, the toner image disturbance mainly tends to occur.

Figure 10A:
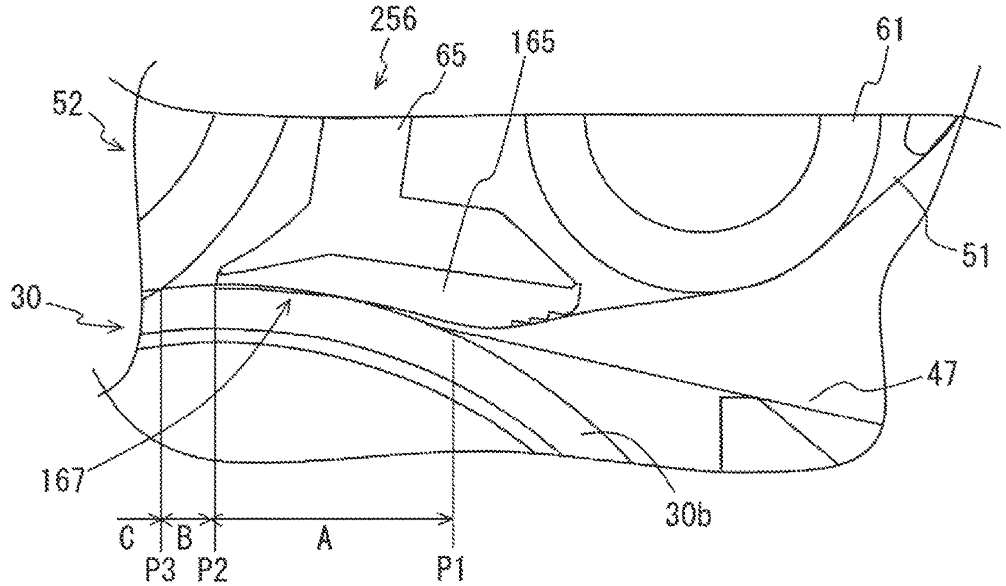
FIG. 10A is a main portion configuration diagram illustrating a configuration around the nip portion of a fixation device employing a pad in a comparative example 2.
Figure 10B:
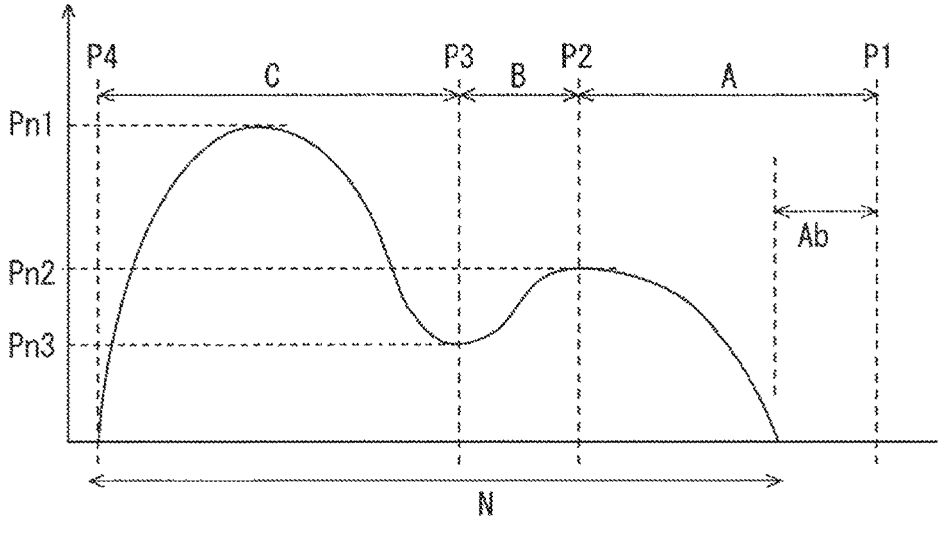
FIG. 10B is a graph illustrating distribution of pressure generated between the fixation belt and the pressure roller over the entire region of the nip portion and the region therearound in a comparative example 2.

Meanwhile, FIG. 10A is a main portion configuration diagram illustrating a configuration around the nip portion 70 (see FIG. 2) of a fixation device being a comparative example 2 and employing a pad 256, and FIG. 10B is a graph illustrating distribution of pressure generated between the fixation belt 51 and the pressure roller 30 over the entire region of the nip portion and the region therearound. The fixation device being a comparative example 2 herein is different from the fixation device 3 (see FIG. 2) in that the heat-resistant elastic member 166 having the shape different from that of the heat-resistant elastic member 66 is used and in that conditions of pressure contact of the heat-resistant elastic member 166 with the pressure roller 30 are different from the conditions of pressure contact of the heat-resistant elastic member 66 with the pressure roller 30. However, other portions are the same.

As illustrated in FIG. 10A, in this comparative example, the facing surface 167 of the heat-resistant elastic member 166 of the pad 256 is formed in the arc shape and the radius of this arc is formed to be 20 mm which is the same as the radius Rp (20 mm) of the outer shape of the pressure roller 30. Moreover, by tilting the pad 256 in the counterclockwise direction from a comparative example 1 illustrated in FIG. 9A, the heat-resistant elastic member 166 is attached such that the pressure contact force in the downstream end portion P2 is greater than that in the upstream end portion P1.

Note that, although the nip region A, the upstream end portion P1 thereof, and the downstream end portion P2 thereof defined in FIGS. 9A and 9B illustrating the configuration of a comparative example 1 are used in a comparative example 2 as they are for the sake of convenience, as illustrated in FIGS. 10A and 10B, an introduction region Ab near the upstream end portion P1 of the nip region A is lifted from the pressure roller 30.

In this case, as illustrated in FIG. 10B, the maximum nip pressure Pn2 in the nip region A (excluding the introduction region Ab) in which the heat-resistant elastic member 166 comes into contact with the pressure roller 30 and the minimum nip pressure Pn3 in the nip region B (low pressure region) are both about the same as those in the embodiment (illustrated in FIG. 6B). However, the recording sheet 47 comes into contact with the fixation belt 51 in the introduction region Ab and the rubbed print mainly tends to occur.

Although the case where the recording sheet 47 (normal sheet) is used as the print medium is described in the aforementioned one or more embodiments, the present invention is not limited to this. For example, the print medium may be a special sheet such as an OHP sheet, a card, a letter card, a thick paper with a grammage of about 450 $g/m^2$ or more, an envelope, or a coated sheet with large heat capacity. Moreover, although the case where the heater 53 is a flat heater is described in the aforementioned one or more embodiments, a heater in which the sliding contact surface with the fixation belt 51 has substantially the same curvature as the fixation belt 51, a heater having a cylindrical shape, or a halogen heater may be used. Furthermore, the fixation belt may be made of material capable of electromagnetic induction and be heated by induction heating. The type and shape of the heater are not limited.

Moreover, although the samples in which the radius Rp of the pressure roller 30 is 20 mm are tested in the aforementioned one or more embodiments, the radius Rp is not limited to this. It is confirmed that similar test results can be obtained at least for samples in which the radius Rp is 15 to 20 mm.

Furthermore, although the configuration in which the heater 53 is arranged in the fixation belt 51 is described in the aforementioned on or more embodiments, the heater may be arranged outside the fixation belt. As described above, the present invention can be implemented in various modes.

As described above, in the fixation device in the one or more embodiments, it is possible to increase the nip region and sufficiently perform pressure application necessary for the fixation by providing the pad 56. In addition, it possible to apply appropriate pressure with the pad 56 and eliminate the region in which the fixation belt 51 and the recording sheet 47 excessively come close to each other outside the nip portion. This can contribute to reliable fixation and prevention of the toner image disturbance and the rubbed print.

Although the case where the color printer is used as the image forming apparatus is described above, the present invention can be applied to a monochrome printer, a photocopier, a facsimile machine, a multi-function printer in which these apparatuses are combined, or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A fixation device comprising:

an endless belt member;

a first roller that is arranged inside the belt member;

a second roller that is arranged outside the belt member and that is biased toward the first roller with the belt member arranged between the second roller and the first roller; and a pressure member that is arranged inside the belt member and adjacent to the first roller and that is biased toward the second roller with the belt member arranged between the pressure member and the second roller, wherein a facing surface of the pressure member that faces the second roller includes a first flat section and a second flat section that intersect at an intersecting portion, a first end portion of the first flat section on the opposite side to the intersecting portion, a second end portion of the second flat section on the opposite side to the intersecting portion, and the intersecting portion are located on an imaginary arc in a cross section perpendicular to the intersecting portion, and a radius R of the imaginary arc satisfies an inequality of $$(1/2)\times Rp \leq R \leq (19/20)\times Rp$$

with respect to a radius Rp of the second roller.

2. The fixation device according to claim 1, wherein the intersecting portion is set in a region whose center in a direction of a line connecting the first end portion and the second end portion is at a center of the line, and in the direction of the line, a width of the region satisfies an inequality of $$W2<(1/3)\times W1$$

where W2 is the width of the region and W1 is a distance between the first end portion and the second end portion.

3. The fixation device according to claim 1, wherein when the radius R of the imaginary arc is 15 mm, the pressure member is biased by a biasing member such that a nip pressure in the second end portion arranged on the first roller side is 1 to 1.5 $kgf/cm^2$.

4. The fixation device according to claim 1, wherein the belt member rotationally moves with rotation of the first roller and is heated by a heating member arranged in contact with the belt member.

5. The fixation device according to claim 4, wherein the heating member is arranged inside the belt member and is biased in such a direction that the belt member is tensioned.

6. The fixation device according to claim 1, wherein the pressure member includes a supporting base member made of metal and a heat-resistant elastic member fixed to the supporting base member and facing the second roller, and the facing surface is formed on the heat-resistant elastic member.

7. An image forming apparatus comprising the fixation device according to claim 1.

8. An image forming apparatus comprising:

an image forming unit that includes an image carrier and that forms an electrostatic latent image on the image carrier and forms a developer image by attaching developer to the electrostatic latent image;

a transfer device that transfers the developer image to a medium; and the fixation device according to claim 1 that fuses the developer image on the medium to the medium.

* * * * *